(12) United States Patent
Salvadori et al.

(10) Patent No.: US 7,567,932 B1
(45) Date of Patent: Jul. 28, 2009

(54) DERIVATIVES TRADING METHODS THAT USE A VARIABLE ORDER PRICE

(75) Inventors: David Salvadori, Bartlett, IL (US); Arjuna Ariathurai, Chicago, IL (US); John Falck, Chicago, IL (US); James W. Farrell, Carol Stream, IL (US); Scott Johnston, Oak Park, IL (US); Agnes S. Thiruthuvadoss, Chicago, IL (US); Charlie Troxel, Jr., Naperville, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 191 days.

(21) Appl. No.: 11/556,499

(22) Filed: Nov. 3, 2006

Related U.S. Application Data

(63) Continuation of application No. 10/385,152, filed on Mar. 10, 2003, now Pat. No. 7,152,041.

(51) Int. Cl.
*G06Q 40/00* (2006.01)
(52) U.S. Cl. .................................... 705/36 R; 705/35
(58) Field of Classification Search ............. 705/38, 705/36 R, 35
See application file for complete search history.

(56) References Cited

U.S. PATENT DOCUMENTS

| | | | |
|---|---|---|---|
| 5,649,116 A | 7/1997 | McCoy |
| 5,799,287 A | 8/1998 | Dembo |
| 5,924,082 A | 7/1999 | Silverman |
| 5,950,176 A | 9/1999 | Keiser |
| 6,016,483 A | 1/2000 | Rickard |
| 6,018,722 A | 1/2000 | Ray |
| 6,061,662 A | 5/2000 | Makivic |
| 6,195,647 B1 | 2/2001 | Martyn |
| 6,236,972 B1 | 5/2001 | Shkedy |
| 6,263,321 B1 | 7/2001 | Daughtery, III |
| 6,282,521 B1 | 8/2001 | Howorka |
| 6,317,727 B1 | 11/2001 | May |
| 6,321,212 B1 | 11/2001 | Lange |
| 6,347,307 B1 | 2/2002 | Sandhu |
| 6,360,210 B1 | 3/2002 | Wallman |
| 6,418,419 B1 | 7/2002 | Nieboer |
| 6,421,653 B1 | 7/2002 | May |
| 6,505,174 B1 | 1/2003 | Keiser |

(Continued)

FOREIGN PATENT DOCUMENTS

WO     03034297     4/2003

OTHER PUBLICATIONS

Ross, Derek. "Controlling Derivatives". Accountancy. London: Mar. 1995. vol. 115, Iss.1219. p. 138.*

(Continued)

*Primary Examiner*—Lalita M Hamilton
(74) *Attorney, Agent, or Firm*—Banner & Witcoff, Ltd.

(57) ABSTRACT

Methods and systems for an exchange to handle variable derivative product order prices are disclosed. The price of a derivative product order (bid or offer) is updated based on changes in the price of a related underlying product. Price determination variable(s), such as delta and gamma, are used to determine the price of the order. The exchange may periodically recalculate the price without requiring the trader to transmit additional information to the exchange.

12 Claims, 5 Drawing Sheets

U.S. PATENT DOCUMENTS

| | | | |
|---|---|---|---|
| 6,616,725 | B2 | 9/2003 | Cho |
| 6,618,707 | B1 | 9/2003 | Gary |
| 6,622,129 | B1 | 9/2003 | Whitworth |
| 6,850,907 | B2 | 2/2005 | Lutnick |
| 7,024,387 | B1 | 4/2006 | Nieboer et al. |
| 7,089,204 | B1 | 8/2006 | Nieboer et al. |
| 7,117,833 | B2 * | 10/2006 | Spath et al. ............ 123/90.55 |
| 2001/0032163 | A1 | 10/2001 | Fertik |
| 2001/0034695 | A1 | 10/2001 | Wilkinson |
| 2001/0042036 | A1 | 11/2001 | Sanders |
| 2001/0044771 | A1 | 11/2001 | Usher |
| 2001/0056398 | A1 | 12/2001 | Scheirer |
| 2002/0002530 | A1 | 1/2002 | May |
| 2002/0016760 | A1 | 2/2002 | Pathak |
| 2002/0046151 | A1 | 4/2002 | Otero |
| 2002/0049661 | A1 | 4/2002 | Otero |
| 2002/0069155 | A1 | 6/2002 | Nafeh |
| 2002/0073007 | A1 | 6/2002 | Ayache |
| 2002/0082967 | A1 | 6/2002 | Kaminsky |
| 2002/0099651 | A1 | 7/2002 | May |
| 2002/0116317 | A1 | 8/2002 | May |
| 2002/0120542 | A1 | 8/2002 | Higgins |
| 2002/0128955 | A1 | 9/2002 | Brady |
| 2002/0138390 | A1 | 9/2002 | May |
| 2002/0156719 | A1 | 10/2002 | Finebaum |
| 2002/0174055 | A1 | 11/2002 | Dick |
| 2002/0174056 | A1 | 11/2002 | Sefein |
| 2003/0004853 | A1 | 1/2003 | Ram |
| 2003/0009419 | A1 | 1/2003 | Chavez |
| 2003/0023536 | A1 | 1/2003 | Hollerman |
| 2003/0028476 | A1 | 2/2003 | Jenkins |
| 2003/0033212 | A1 | 2/2003 | Sandhu et al. |
| 2003/0033240 | A1 | 2/2003 | Balson |
| 2003/0046218 | A1 | 3/2003 | Albanese |
| 2003/0061148 | A1 | 3/2003 | Alavian |
| 2003/0069821 | A1 | 4/2003 | Williams |
| 2003/0069836 | A1 | 4/2003 | Penney |
| 2003/0074167 | A1 | 4/2003 | Browne |
| 2003/0083978 | A1 | 5/2003 | Brouwer |
| 2003/0093347 | A1 | 5/2003 | Gray |
| 2003/0093360 | A1 | 5/2003 | May |
| 2003/0097328 | A1 | 5/2003 | Lundberg |
| 2003/0101123 | A1 | 5/2003 | Alvarado |
| 2003/0101125 | A1 | 5/2003 | McGill |
| 2003/0115128 | A1 | 6/2003 | Lange |
| 2003/0208430 | A1 | 11/2003 | Gershon |
| 2003/0216932 | A1 | 11/2003 | Foley |
| 2003/0220868 | A1 | 11/2003 | May |
| 2003/0225648 | A1 | 12/2003 | Hylton |
| 2003/0233308 | A1 | 12/2003 | Lundberg et al. |
| 2004/0064393 | A1 | 4/2004 | Luenberger |
| 2004/0083158 | A1 | 4/2004 | Addison |
| 2004/0083165 | A1 | 4/2004 | Lawrence |
| 2006/0160024 | A1 | 7/2006 | Barr |
| 2006/0184447 | A1 | 8/2006 | Nieboer et al. |

OTHER PUBLICATIONS

Zeto, Samuel Yau Man. "Pricing and Hedging American Fixed-Income Derivatives with Implied Volatility Structures in the Two-Factor Heath-Jarrow-Morton Model". The Journal of Futures Markets. Hoboken. Sep. 2002. vol. 22, Iss.9, p. 839.*

Agarwal, Aman. "Defining Parameters of an Underlying Variable (Asset/Value) and Establishing Water Table as Underlying Value". Finance India. Delhi: Dec. 2002. vol. 16, Iss.4; p. 1273.*

"Single Integrated Architecture" [retrieved on Dec. 5, 2003] Retrieved from the internet <URL :http://www.sungard.com/products and services/stars/panorama/solutions/panoramatechnologvandinfrastr.

Senior, Adriana. "Morgan Buying into Network For On-Line Security Trades" [retrieved on Mar. 25, 2005] Retrieved from the internet <URL :http://proquest.uni.com/pqdlink?index=26&sid=1&srchmode=3&vinst=PROD&fmt=3&st.

Ostrovsky, Arkady. "Working towards a seamless link: Global Protocol" [retrieved on Mar. 25, 2005] Retrieved from the internet <URL :http://proquest.uni/com/pqdlink?index=1&sid=1&srchmode=1&vinst=PROD&fmt=3&sta.

"Case Study: BSE implements intelligent switching architecture Combining networks intelligently" [retrieved on Dec. 5, 2003] Retrieved from the internet <URL :http://www.networkmagazineindia.com/200302/case2.shtml.

"BSE The Stock Exchange, Mumbal Network Diagram" [retrieved on Dec. 5, 2003] Retrieved from the internet <URL :http://www.networkmagazineindia.com/200302/case2.shtml.

Domowitz, Ian. "Electronic Derivatives Exchanges: Implicit Mergers, Network Externalities, and Standardization" The Quarterly Review of Economics and Finance, vol. 35, No. 2, Summer, 1995, p. 163-175.

"Derivatives Drive New Network" Barron's, Nov. 4, 1991: 71, 44: ABLINFORM Global, p. 36.

NYFIX, Inc. Routes OTC Orders to American Stock Exchange [retrieved on Dec. 5, 2003] Retrieved from the internet <URL :http://www.prnewswire.com/cgi-bin/stories.pl?ACCT=SVBIZINK3.story&STORY=/www/story/11-24-2.

"Trading and Decision Support" [retrieved on Dec. 5, 2003] Retrieved from the internet <URL :http://www.sungard.com/products_and_services/stars/panoram/solutions/panoramatrading.htm.

"Orc Technology" [retrieved on Dec. 5, 2003] Retrieved from the internet <URL :http://www.orcsoftware.com/Technology/index.htm.

"Creditex widens access" [retrieved on Mar. 29, 2004] Retrieved from the internet <URL:http://www.efinancialnews.com/index.cfm?...on=print_view&passedref=8000000000002212.

Treanor, Jill. "Banks plan trading network for $52 trillion derivatives" [retrieved on Mar. 18, 2004] Retrieved from the internet <URL :http://www.guardian.co.uk/business/story/0,3604,178019,00.html.

"OnExchange Selects Exodus to Host Online Derivatives Exchange; Leading Online Derivatives Exchange Optimizes Network Performance by Selecting Leader in Complex Internet Hosting" [retrieved on Mar. 25, 2004] Retrieved from the internet <URL :http://www.findarticles.com/cf_0/rn0EIN/2000_Nov_7/66857629/pl/article.jhtml.

"ExNet Network" [retrieved on Dec. 5, 2003] Retrieved from the internet <URL:http://www.orcsoftware.com/Products/ExNetPIPNetwork.htm.

"Orc Futures" [retrieved on Dec. 5, 2003] Retrieved from the internet <URL:http://www.orcsoftware.com/Products/OrcFutures.htm.

"Orc Liquidator" [retrieved on Dec. 5, 2003] Retrieved from the internet <URL:http://www.orcsoftware.com/Products/OrcLiquidator/htm.

[Retrieved on Dec. 5, 2003] Retrieved from the internet <URL:http://www.wstonline.com/printableArticle/; jsessionid=NA3QPNTTNKCOIQSNDBCCK....

[Retrieved on Dec. 5, 2003] Retrieved from the internet <URL:http://www.wstonline.com/printableArticle/; jsessionid=ILJHDTNYRJNVMQSNDBCCKHY?docid=14....

"Press Releases" [retrieved Mar. 18, 2004] Retrieved from the internet <URL:htt;:www.swapswire.com/press/10_04_00.asp.

"Single Integrated Architecture" [retrieved on Dec. 5, 2003] Retrieved from the internet <URL:htt;:www.sungard.com/products and services/stars/panorama/solutions/panoramatechnologyvandinfrastr.

"The integrated, real-time solution for bank treasure and portfolio management" SunGard Securities Processing.

"Panorama EQN" [retrieved on Dec. 5, 2003] Retrieved from the internet <URL:htt;:www.sungard.com/products_and_ervices/stars/panorama/solutions/panaromaotcdistribution.htmr.

"Chicago Board of Trade certifies Orc Software for its electronic trading platform" [retrieved on Dec. 5, 2003] Retrieved from the internet <URL:http://www.orcsoftware.com/Company/PNR/PNR 031106 e-shot eng.htm.

"X_Trader Platform" [retrieved on Mar. 18, 2004] Retrieved from the internet URL <http://www.tradingttechnologies.com/blue xtrader.html.

"X_Trader TT Net" [retrieved on Dec. 5, 2003] Retrieved from the internet URL<http://www.tradingttechnologies.com/blue_net.html.

Ritchie, Joseph; Abstract "Why Market Maker Position Limits Should Be Delta-Based"; Futures, vol. 17, No. 9, pp. 42 (2), Aug. 1988; UMI Publication No. 00415047.

Meyer, Thomas O.; "Calculation and comparison of delta-neutral and multiple-Greek dynamic hedge returns inclusive of market frictions"; Department of Commerce, International Review of Economics and Finance;12 (2003); pp. 207-235.

Temple, Peter, et al; World Reporter (TM); Investors Chronicle; Dec. 11, 1998; Copyright (C) 1998 Investors Chronicle; p. 62.

Holter, James T.; It's Liquidity Stupid, CBOE Ups S & P Limits; www.futuresmag.com; Nov. 1996.

Kawaller, Ira G; "A novel approach to transactions-based currency exposure management"; Financial Analysts Journal; Nov./Dec. 1992; 48, 6; p. 79.

"S&P ComStock/Micro Hedge Windows: results rooted in reliability."; Futures (Cedar Falls, Iowa); Annual 1993 v22 n7 p. 26(1); Copyright Oster Communications Inc. 1993.

* cited by examiner

Variable Derivative Product Order 300

302 → Account number: _____

304 → Underlying Contract: _____

306 → Expiration Month: _____

308 → Put or Call: _____

310 → Buy or Sell: _____

312 → Quantity: _____

314 → Strike Price: _____

316 → Delta: _____

318 → Gamma: _____

320 → Vega: _____

322 → Hedge Order: _____

324 → Formula

326 →  ○ Standard  ChgUnderlyingPrice*delta+(1/2(ChgUnderlying*gamma)^2)

328 →  ○ Custom

330 →   → Formula: _____

332 →   → Variables: _____

Figure 3

DERIVATIVES TRADING METHODS THAT USE A VARIABLE ORDER PRICE

This application is a continuation of application Ser. No. 10/385,152 filed Mar. 10, 2003, the entire disclosure of which is hereby incorporated by reference.

FIELD OF THE INVENTION

The present invention relates to derivative product trading methods and systems and, in particular, to methods and systems that utilize a variable defined order price.

DESCRIPTION OF THE RELATED ART

Computer systems and networks are increasingly being used to trade securities and derivatives. Computer systems and networks provide several advantages when compared to manual methods of trading. Such advantages include increased accuracy, reduced labor costs and the ability to quickly disseminate market information.

Options are frequently traded via computer systems and methods. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders typically use theoretical models to determine the prices at which they will offer to buy and sell options. The theoretical option pricing models often produce values that reflect an option's sensitivity to changes in predefined variables. These predefined variables are assigned Greek letters, such as delta, gamma, theta and kappa. Kappa is sometimes referred to as vega or tau. Delta is a measure of the rate of change in a derivative's theoretical value for a one-unit change in the price of the option's underlying contract. Thus, delta is the theoretical amount by which the derivative price can be expected to change for a change in the price of the underlying contract. As such, delta provides a local measure of the equivalent position risk of an option position with respect to a position in the underlying contract. A "50 Delta" option should change its price 50/100, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary measures used by those who trade in options.

A single option order typically identifies the underlying security, the expiration month, whether the option is a call or a put, the strike price and all other standard order terms (e.g. buy/sell, quantity, account number etc.). Each time the price of the underlying contract changes or one of the variables in the trader's theoretical model changes, a trader may cancel all of the relevant pending orders, recalculate new order prices and transmit new order prices to the exchange. It is not uncommon for the price of an underlying contract to change multiple times per second. In addition to receiving a large volume of order traffic, options exchange computer systems transmit current market data to traders. One skilled in the art will appreciate that the amount of data sent to and from an options exchange computer system can be a significant challenge for the computer system and can limit the scalability of the computer system. In addition, there is a similar challenge to manage the bandwidth usage between the option's exchange computer system and network connecting the end user given the high volume of associated market data updates.

Therefore, there is a need in the art for improved derivative product trading methods and systems that better manage the amount of information that must be exchanged between traders and an exchange computer system.

SUMMARY OF THE INVENTION

The present invention overcomes the problems and limitations of the prior art by providing methods and systems that utilize a variable derivative product order price. Derivative products include options on futures contracts, futures contacts that are functions of other futures contracts, or other financial instruments that have their price related to or derived from an underlying product. The variable derivative product order price may be in the form of a model used to price options. When one of the variables of the model changes, an exchange computer system may recalculate the derivative product's price without requiring the trader to transmit additional or different information to the computer system.

In one embodiment, a method of trading variable derivative product orders at an exchange is provided. The method includes receiving from traders a plurality of derivative product orders. Each of the orders has a price that is a function of a predetermined formula, at least one underlying product and price determination variable values supplied by the trader. Bid and offer prices are calculated by applying the price determination variable values and underlying product values to the predetermined formula. Trades are executed based on matching bids and offers.

In another embodiment, a method of determining variable derivative product order prices is provided. A plurality of variable derivative product order prices that are each a function of at least one value of an underlying product are received from an exchange. Values of the underlying products are also received from the exchange. The variable derivative product order prices are determined from the received information.

In yet another embodiment of the invention, a method of distributing variable derivative product order information is provided. Variable derivative product order prices that are a function of at least one value of at least one underlying product are received from a first plurality of users. The variable derivative product order prices and the at least one value of the at least one underlying product are transmitted to a second plurality of users In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 illustrates a variable derivative product order in accordance with an embodiment of the invention;

DETAILED DESCRIPTION OF THE INVENTION

Figure 1:
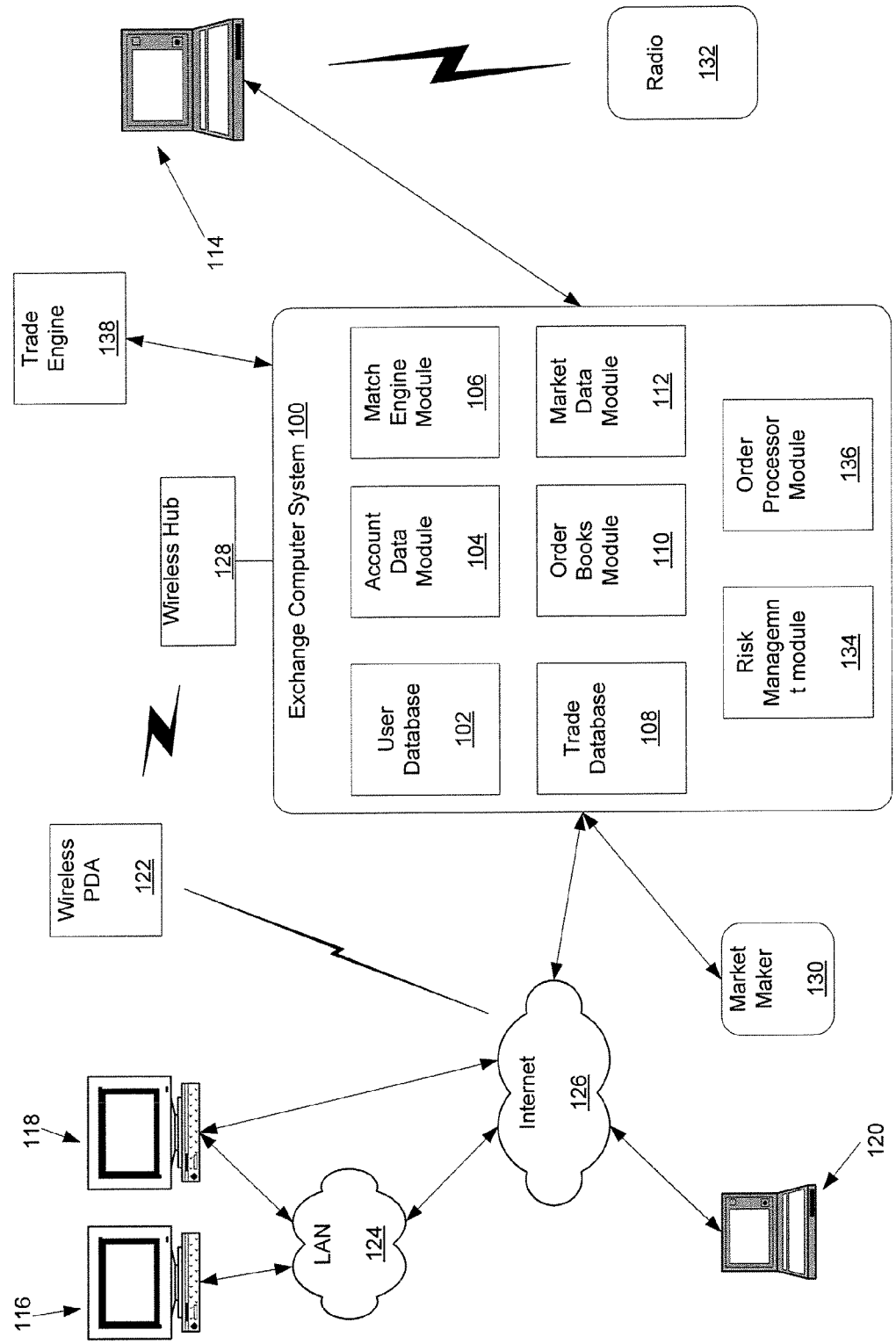
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.)

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit order or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
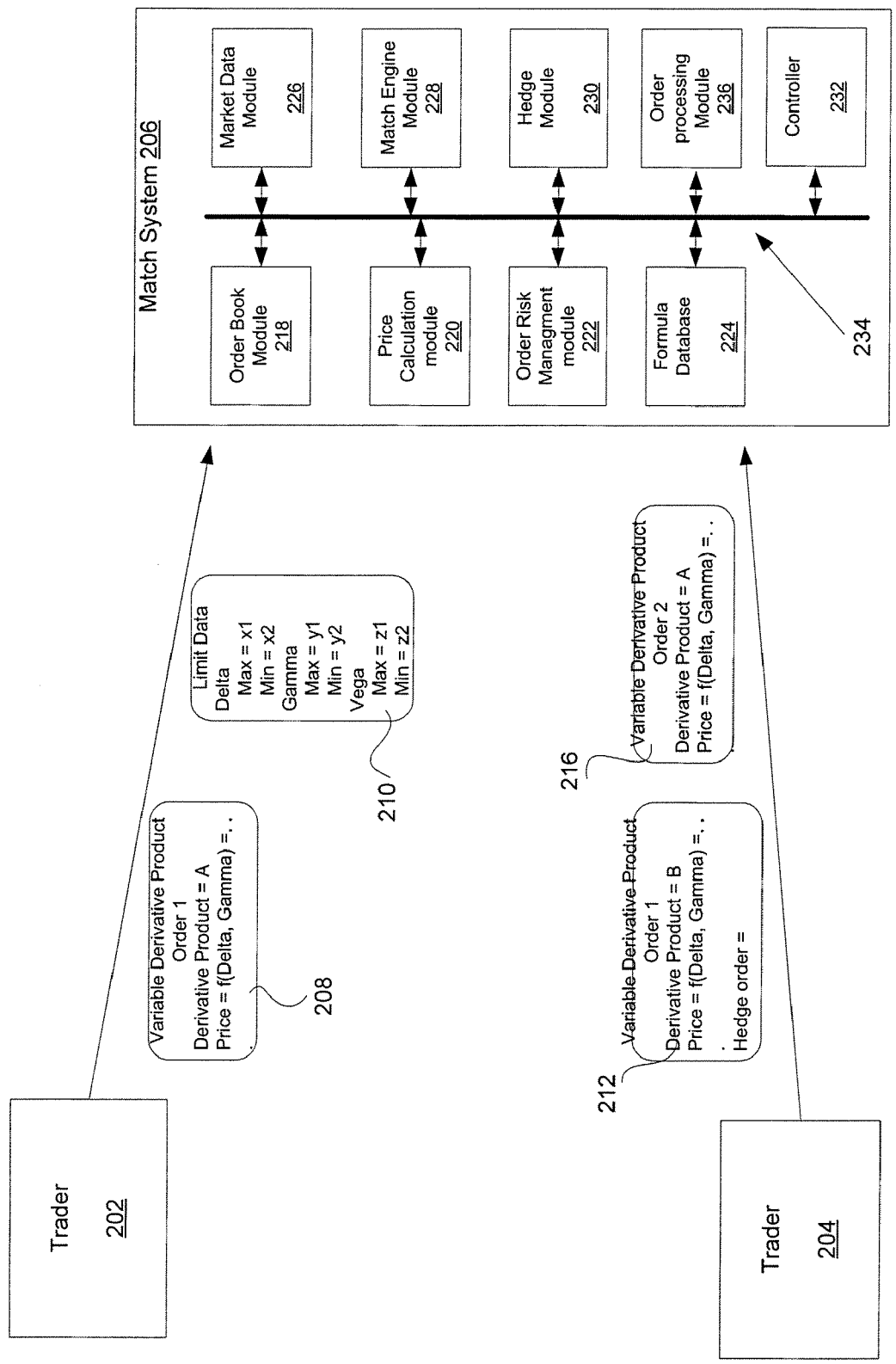
FIG. 2 illustrates a system in which traders exchange information with a match system, in accordance with an embodiment of the invention.

FIG. 2 illustrates a system in which traders 202 and 204 exchange information with a match system 206, in accordance with an embodiment of the invention. Trader 202 is shown transmitting a variable derivative product order 208 and a limit data 210 to match system 206. Variable derivative product order 208 includes the identification of a derivative product and a variable order price. Variable derivative product orders are described in greater detail below in connection with FIG. 3. Limit data 210 may act as a throttle to limit the number of transactions entered into by trader 202. Limited data is also described in greater detail below. Trader 204 transmits derivative product orders 212 and 216 to match system 206. Each trader may transmit several derivative product orders and may associate limit data with one or more of the derivative product orders. As shown in order 212, one or more of the orders may include the identification of a hedge transaction.

Match system 206 may include several modules for determining prices, matching orders and executing transactions. An order book module 218 may be included to maintain a listing of current bid and offer prices. A price calculation module 220 calculates order prices based on price determination variables provided as part of variable derivative product orders. Price calculation module 220 may also calculate order prices based on formulas received from traders. For example, derivative product order 208 may include a formula that is a function of an underlying contract, delta and gamma. Price calculation module 220 may be configured to calculate an order price every time the price of the underlying contract changes.

Price calculation module 220 may use a default formula with price determination variable values supplied by a trader. In one embodiment, the change in a derivative product price is equal to $$\text{ChgUnderlyingPrice}*\text{delta}+ (\tfrac{1}{2}(\text{ChgUnderlyingPrice}^2*\text{gamma})), \qquad (1)$$

wherein ChgUnderlyingPrice is the change in the underlying price. A trader would supply price determination variables delta and gamma and price calculation module would track the derivative product price as the underlying contract changes.

An order risk management module 222 may be included to act as a limit for the user's exposure for a given risk variable as defined by the user. For example, trader 202 provided maximum and minimum delta, gamma and vega values to match system 206. Those values may be stored in the order risk management module 222 and computed before executing transactions. Depending on the user's order types and risk utilization for a given risk variable, the user's resting orders for a particular contract may be auto canceled by match system 206 so that the user is no longer at risk to exceed their limits. In addition, and depending on the user's order type and risk utilization for a given risk variable, the user's ability to enter a buy or sell order may be prohibited should the execution of that order cause the user to exceed their particular order risk management limit.

A formula database 224 may be included to store derivative product order formulas. The formulas may be provided by traders or may be standard formulas provided by an exchange. A market data module 226 may be used to collect and disseminate market data. A match engine module 228 matches bid and offer prices. Match engine module 228 may be implemented with software that executes one or more algorithms for matching bids and offers. A hedge module 230 may be included to perform hedge transactions based on derivative product transactions. The use of hedge transactions to counteract the risks associated with derivative product trading is well known in the art. In one embodiment of the invention, hedge module 230 conducts transactions with another trading engine other than match system 206. Hedge module 230 may also perform some or all of the function of risk management module 134 (shown in FIG. 1). An order processing module 236 may be included to decompose delta based and bulk order types for processing by order book module 218 and match engine module 228. A controller 232 may be included to control the overall operation of the components show coupled to bus 234. Controller 232 may be implemented with a central processing unit. Match system 206 may include modules that perform some or all of the functions of the modules shown in FIG. 1. Moreover, match system 206 may also be coupled to some or all of the elements shown in FIG. 1.

FIG. 3 illustrates a variable derivative product order 300 in accordance with an embodiment of the invention. Variable derivative product order 300 may include a field 302 for identifying a trader's account number. The underlying contract may be identified in field 304. The expiration month of the derivative product order may be identified in field 306. The order may be identified as a put or a call in field 308 and whether the order is to buy or sell in field 310. The quantity may be identified in field 312 and the strike price may be identified in field 314. Delta, gamma, and vega values may be identified in fields 316, 318 and 320 respectively. Of course, other price determination variables may also be identified as part of a standard variable derivative product order. The formula for calculating the price of variable derivative product order is identified in field 324. The trader can select a standard formula 326 to compute their derivative product price or select a custom formula 328. In one embodiment, a standard formula is supplied by or sponsored by an exchange. When a custom formula is selected, the trader may also provide a formula in field 330 and the variables in field 332. In one implementation of the invention, variable derivative product order 300 is created in the form of an XML for HTML document created by one of the computer devices shown in FIG. 1. Variable derivative product order 300 may be encrypted before being transmitted to an exchange. Of course one or more additional or alternative fields may be included. For example, a reference price may be included to protect against in flight conditions when the reference price changes while variable derivative product order 300 is in transit.

Figure 4:
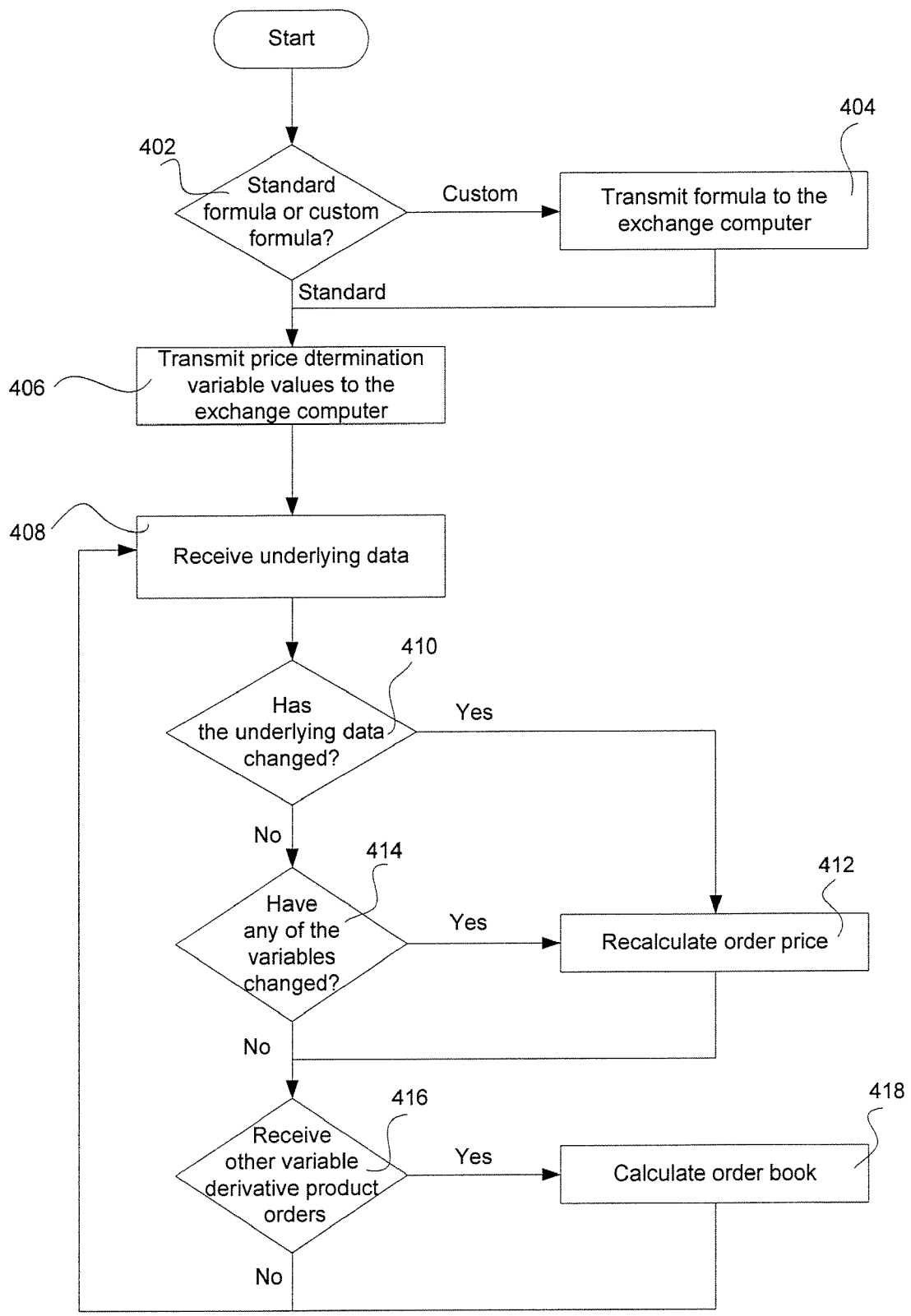
FIG. 4 illustrates a computer implemented method of trading a derivative product contract that involves the use of a variable order price, in accordance with an embodiment of the invention.

FIG. 4 illustrates a computer-implemented method of trading a derivative product contract that involves the use of a variable order price, in accordance with an embodiment of the invention. First, in step 402 it is determined whether the trader desires to use a standard exchange sponsored formula. In step 406, the trader transmits price determination variable values for the standard formula to an exchange computer. For example, step 406 may include transmitting delta and gamma values to an exchange computer. In step 408 the trader receives underlying data. The underlying data may include current bid and offer prices for underlying put and call futures contracts.

In step 410 it is determined whether the underlying data has changed. The price of an underlying contract may change multiple times per second. When the underlying contract data has changed, in step 412 the trader's computer device may recalculate the order price of their delta based order and all other delta based orders from other users based on current data. In step 414, it is determined whether any of the price determination variables used in the formula to calculate the order price have changed. The price determination variables may include delta, gamma, and vega. When the price determination variables have changed, in step 412, the order price is recalculated. Of course, step 412 may be performed based on changes in current underlying contract data and variables. The order price may be displayed to the trader or plotted on a graph that tracks order prices.

One of the advantages of the present invention is that it allows traders to maintain an order book and limits the amount of information that must be disseminated by an exchange computer. In particular, an exchange computer may transmit a plurality of variable derivative product orders to several different traders only when other derivative product order users establish their initial positions. Thereafter, the exchange computer may then only transmit underlying data or other data used to calculate variable derivative product order prices. Each trader computer may then periodically calculate current order prices based on information received from the exchange computer. For example, in step 416 it is determined whether other variable derivative product orders are received. When variable derivative product orders are received, in step 418 the trader computer may calculate new order book listings for current bids and offers related to variable derivative product based orders. The order book may be displayed to the trader in any one of a variety of conventional formats. After step 418, control returns to step 408.

Figure 5:
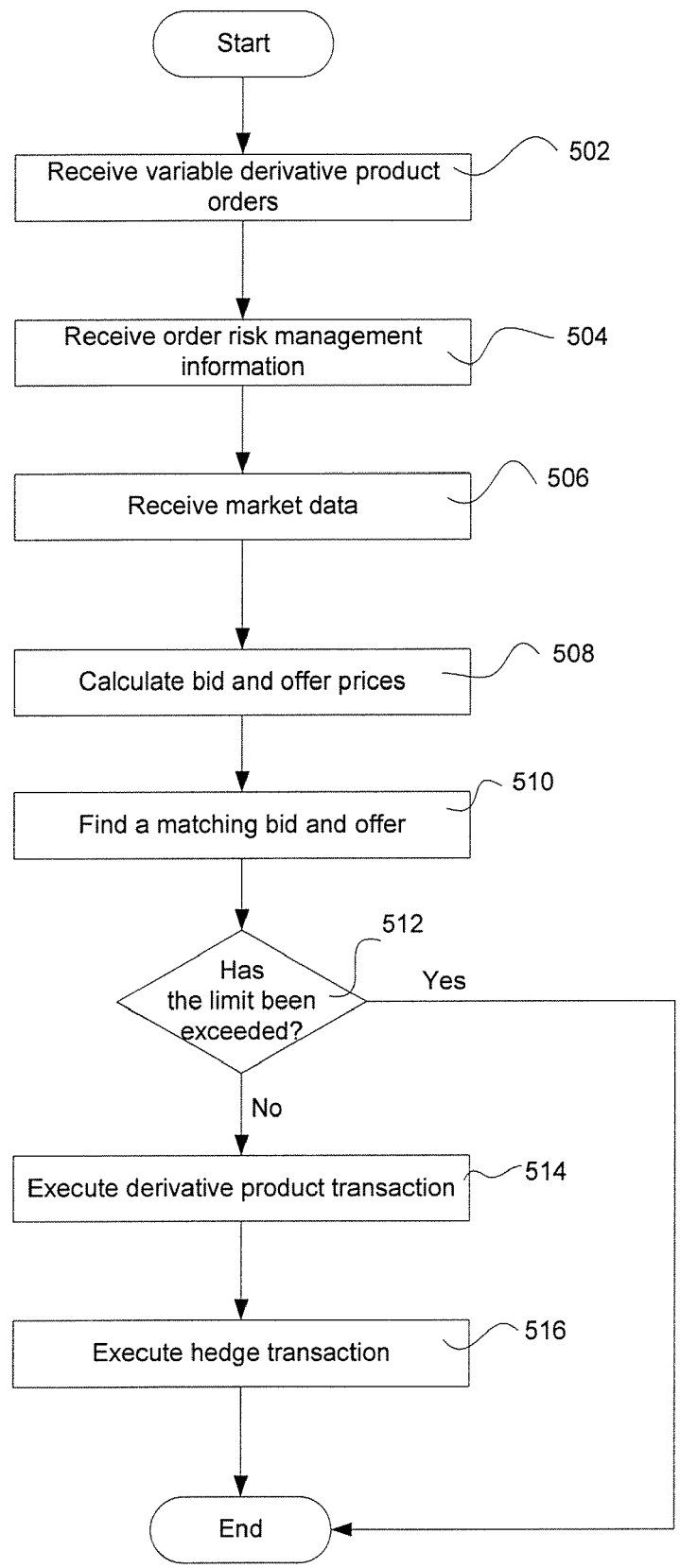
FIG. 5 illustrates a method of processing variable derivative product orders by an exchange computer in accordance with an embodiment of the invention.

FIG. 5 illustrates a method of processing variable derivative product orders by an exchange computer in accordance with an embodiment of the invention. First, in step 502 the exchange computer receives variable derivative product orders. As described above, the variable derivative product orders may be in the form of one or more formulas containing one or more price determination variables. In step 504, exchange computer may receive order risk management information to limit the user's exposure for a particular risk variable as given by the trader. Next, the exchange computer may receive or otherwise produce market data in step 506. The market data may include current underlying prices that may be used to calculate variable derivative product order prices. In step 508, bid and offer prices are calculated. The calculations may be based on a combination of formulas and variables provided by traders and/or the exchange. In step 510 the exchange computer finds a matching bid and offer. A matching bid and offer may be found by match engine 228. Before executing a transaction, in step 512 it is determined whether one or more order risk management limits provided by the trader have been exceeded. When a limit has been reached, all outstanding orders that contribute to the risk limit being exceeded further are automatically cancelled by the computer system. When the limits have not been exceeded, in step 514 the derivative product transaction is executed. Finally, in step 516 a hedge transaction may also be executed. A hedge transaction may be executed shortly after the execution of the derivative product transaction on a best efforts basis. Of course, an exchange computer may be configured to repeat the method shown in FIG. 5 several times.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, while aspects of the present invention have been described in connection with the trading of derivative products, in other embodiments, aspects of the invention may be used in connection with the trading of securities, such as debt, foreign exchange, and equity commodities, and other instruments for which options or other derivative instruments are traded.

The invention claimed is:

1. A method of dynamically determining a price for an order for a derivative product at an exchange, comprising:
    (a) receiving at an exchange that includes a match engine that matches orders for derivative products and from a trader at an exchange a variable priced order for a derivative product, where the variable priced order comprises an original order price and a formula for updating the order price as a function of a change in an underlying product price and the formula includes values for a delta variable and a gamma variable; and
    (b) in response to a change in the underlying product price, utilizing the formula at an exchange computer to update the variable priced order price without further input from the trader wherein the formula for updating the order price as a function of a change in an underlying product price comprises:

$$\text{Change in price of the order} = \text{ChgUnderlyingPrice} * \text{delta} + (\frac{1}{2}(\text{ChgUnderlyingPrice}^2 * \text{gamma}))$$

where ChgUnderlyingPrice is the change in price of the underlying product.

2. The method of claim 1 further comprising:
    (c) periodically determining a price for the variable priced order based on the formula and a more recent price for the underlying product.

3. The method of claim 1, further including:
    (c) executing a trade that includes the variable priced order.

4. The method of claim 3 further including:
    (d) executing a hedge transaction at the time of executing the trade.

5. The method of claim 4, wherein the hedge transaction comprises buying or selling an underlying derivative.

6. The method of claim 5, wherein (d) includes locating a bid or offer for the underlying derivative.

7. The method of claim 4, wherein information for the hedge transaction is included in the variable priced order.

8. The method of claim 7, wherein (d) comprises executing a hedge transaction at an exchange other than the exchange used to process the variable priced derivative product order.

9. The method of claim 4, wherein the hedge transaction comprises a fill or kill transaction.

10. The method of claim 4, wherein the hedge transaction comprises a fill and kill transaction.

11. The method of claim 1, wherein the formula is supplied by the exchange.

12. A computer-readable medium containing computer-executable instructions for causing an exchange computer device to perform the steps comprising:
    (a) receiving at an exchange that includes a match engine that matches orders for derivative products at an exchange a variable priced order for a derivative product, where the variable priced order comprises an original order price and a formula for updating the order price as a function of a change in an underlying product price and the formula includes values for a delta variable and a gamma variable; and
    (b) in response to a change in the underlying product price, utilizing the formula at an exchange computer to update the variable priced order price without further input from the trader;
    wherein the formula for updating the order price as a function of a change in an underlying product price comprises:

$$\text{Change in price of the order} = \text{ChgUnderlyingPrice} * \text{delta} + (\frac{1}{2}(\text{ChgUnderlyingPrice}^2 * \text{gamma}))$$

where ChgUnderlyingPrice is the change in price of the underlying product.

* * * * *